US012785905B2

(12) United States Patent
Sangal et al.

(10) Patent No.: US 12,785,905 B2
(45) Date of Patent: Nov. 3, 2026

(54) SYSTEM AND METHOD FOR DATA TRANSFER ACROSS DISTRIBUTION UNITS TO SUPPORT INTER VIRTUAL DISTRIBUTION UNIT CARRIER AGGREGATION

(71) Applicant: MAVENIR SYSTEMS, INC., Richardson, TX (US)

(72) Inventors: Sapna Sangal, Bangalore (IN); Charles Santhosam Lourdu Raja, Bangalore (IN); Rajarajan Sivaraj, Plano, TX (US)

(73) Assignee: MAVENIR SYSTEMS, INC., Richardson, TX (US)

( * ) Notice: Subject to any disclaimer, the term of this patent is extended or adjusted under 35 U.S.C. 154(b) by 290 days.

(21) Appl. No.: 18/591,782

(22) Filed: Feb. 29, 2024

(65) Prior Publication Data

US 2024/0297767 A1 Sep. 5, 2024

(30) Foreign Application Priority Data

Mar. 3, 2023 (IN) ............................. 202321014543
Aug. 2, 2023 (IN) ............................. 202321051988
Dec. 21, 2023 (IN) ............................. 202321087663

(51) Int. Cl.
*H04L 5/00* (2006.01)
*H04L 1/1812* (2023.01)

(52) U.S. Cl.
CPC .......... *H04L 5/0055* (2013.01); *H04L 1/1812* (2013.01)

(58) Field of Classification Search
CPC ..... H04L 5/0055; H04L 1/1812; H04L 5/001; H04L 5/00; H04L 1/1829; H04W 76/12; H04W 76/15; H04W 80/02; H04W 88/08
See application file for complete search history.

(56) References Cited

U.S. PATENT DOCUMENTS 9,755,726 B2 9/2017 Balachandran et al.
2014/0362829 A1* 12/2014 Kazmi ................. H04L 5/0032 370/332

(Continued)

FOREIGN PATENT DOCUMENTS

CN 115706649 A 2/2023

OTHER PUBLICATIONS

Extended European Search Report for corresponding European patent application No. 24160929, 10 pages, dated Nov. 29, 2024.

*Primary Examiner* — Mewale A Ambaye
(74) *Attorney, Agent, or Firm* — Ruggiero McAllister & McMahon LLC

(57) ABSTRACT

Described are systems and methods for a cellular communication. These include a group of gNBs, DUs, and CUs, each with multiple sectors, communicating with a set of UEs; each CU/DU/gNB being configured to operate in a separate server or a same server, and each CU/DU/gNB being configured to be physically located at a same place or different places; each of the set of UEs comprising a plurality of SCELLs running in different DUs, whereby a pDU MAC (PCELL MAC) module is configured to operate in one DU and a sDU MAC (SCELL MAC) module is configured to operate in a different one of the DUs; an a MAC module in each DU is configured to exchange a message with a peer DU MAC module for a seamless data transfer for supporting inter DU/vDU carrier aggregation for a UE of the set of UEs.

22 Claims, 10 Drawing Sheets

[redacted]

(56) References Cited

U.S. PATENT DOCUMENTS

| | | | | |
|---|---|---|---|---|
| 2015/0365911 | A1* | 12/2015 | Mohandas | H04W 76/11<br>370/338 |
| 2021/0160940 | A1* | 5/2021 | Majmundar | H04W 24/08 |
| 2022/0191112 | A1* | 6/2022 | Gupta | H04L 41/5054 |
| 2022/0408377 | A1* | 12/2022 | Kotaru | H04W 52/241 |
| 2024/0114070 | A1* | 4/2024 | Krasilnikov | H04L 67/1095 |
| 2025/0037032 | A1* | 1/2025 | Tang | G06N 3/098 |
| 2025/0193730 | A1* | 6/2025 | Kok | H04L 61/50 |

* cited by examiner

Figure 1: MAC Functional division

Figure 2. Data Transfer from pDU to sDU

Figure 3. User Data between pDU and sDU

Figure 4. PUCCH Data between pDU and sDU

SYSTEM AND METHOD FOR DATA TRANSFER ACROSS DISTRIBUTION UNITS TO SUPPORT INTER VIRTUAL DISTRIBUTION UNIT CARRIER AGGREGATION

CROSS REFERENCE TO RELATED APPLICATIONS

This application claims priority to Indian Provisional Patent Application No. 2023/21014543, filed on Mar. 3, 2023, Indian Provisional Patent Application No. 2023/21051988, filed on Aug. 2, 2023, and Indian Provisional Patent Application No. 202321087663, filed on Dec. 21, 2023, the entirety of each of which is incorporated herein by reference.

DESCRIPTION OF THE RELATED TECHNOLOGY

Field of the Disclosure

The present disclosure relates to systems and methods for radio access networks. The present disclosure is related to the design of operation, administration and management of various network elements of 4G and 5G based mobile networks.

Description of the Related Art

For enhancing data throughput in DL direction, there is a provision to add other cells for data transfer. These other cells can belong to other DUs which might be supporting different technology or can be from different vendor.

Using current MRDC techniques as of the present filing, both the DUs can be used, but this requires 2 links towards UE and is involved in L3 messaging etc. It is not transparent to UE and also is not very good for cell edge coverage.

To explain, MRDC can be used to enhance the throughput without inter DU CA. One way to increase performance is by using a MRDC procedure as described in "METHOD AND APPARATUS FOR IMPROVED MULTI-CARRIER COMMUNICATION," U.S. Pat. No. 9,755,726. But in this procedure links are established towards UE. It will depend on UE capability as well if same is supported or not. RLC entities will be running in parallel to receive data from 2 links and PDCP will be combining the data.

SUMMARY

Described are systems and methods for a cellular communication system In an implementation, described are systems and methods for a cellular communication system comprising:

- a group of gNBs, DUs, and CUs, each with multiple sectors, communicating with a set of UEs;
- each CU/DU/gNB being configured to operate in a separate server or a same server, and each CU/DU/gNB being configured to be physically located at a same place or different places;
  - each of the set of UEs comprising a plurality of SCELLs running in different DUs, whereby a pDU MAC (PCELL MAC) module is configured to operate in one DU and a sDU MAC (SCELL MAC) module is configured to operate in a different one of the DUs; and
  - a MAC module in each DU is configured to exchange a message with a peer DU MAC module for a seamless data transfer for supporting inter DU/vDU carrier aggregation for a UE of the set of UEs.

The system can comprising the group of DUs, each DU having 1, 2 or 3 sectors.

The pDU MAC module can be configured to share the available buffer information with sDU MAC modules for DL data transfer for a UE.

The sDU MAC module can be configured to request for the data from pDU MAC module once UE is scheduled in SCELL for data transfer.

The sDU MAC module can be configured to share the timing information SFN, Slot with pDU MAC, where UE is getting scheduled.

The sDU MAC module can be configured to share the data on each logical channel of TB Size for data transfer on the SFN/Slot mentioned to pDU MAC.

The pDU MAC module can be configured to allocate the PUCCH resources, using the timing information provided by sDU MAC, for HARQ feedback for data transmitted on SCELL. The pDU MAC module is configured to form the TB of size provided by this sDU MAC.

The pDU MAC module can be configured to share the data as well as the PUCCH resources with peer DU MAC.

The pDU MAC module can be configured to receive the PUCCH data from UE and forwards it to sDU MAC module for handling.

The sDU MAC module can be configured to inform the data transfer status with pDU MAC module.

An RRE MAC module can be configured to receive data from pDU to transmit for supporting CoMP.

An RRE MAC module can be configured to receive PUCCH information from a pDU to transmit for supporting CoMP.

For a plurality of O-DUs, each O-DU can update a O-CU about the cells from the another O-DU with which the O-DU has a D2 relationship and thus can be responsible for configuring the cells from the other O-DU for functionalities such as CA, DSS, and so on. The O-DU can use a special value of RAN Area Code for each cell from the other O-DU about which it informs to the O-CU, thus enabling the O-CU to interpret that the O-DU is not directly serving these cells but is responsible for configuring these cells via the inter-DU D2 relationship for functionalities such as CA, DSS, CoMP, and so on.

The system can be implemented in a O-RAN, CRAN and/or DRAN architecture. In the system, the CU, DU, gNBs are configured with SCells from other DUs. The DUs IP, port, CRNTI and other parameters, are configured in order for DUs to interwork with each other.

The CU can configure DU with SCells from other DUs to be configured for a UE.

A pair of the DUs can be configured to use a single tunnel to exchange the user data and Scell modification procedures for all the UEs between the DUs, wherein the tunnel can be established either at a DU-DU link establishment or at a Scell addition for a first UE of the set of UEs between the pair of DUs. The tunnel can be a GTP tunnel or any other tunnel. The tunnel can be established either at a DU-DU link establishment or at the Scell addition for first UE between the pair of DUs.

A pair of the O DUs can be configured combine multiple messages into a single message to be transferred on a GTP. This can ensure the lesser message exchange between DUs.

DUs on reception of combined message, based on parameters (e.g. UE-ID, CRNTI, message IDs) can handle the messages.

All the DUs, which are supporting spectrum aggregation, can be configured with a transport mechanism to exchange messages with each other. The transport mechanism includes via SCTP, GTP, eGTP, RPC or any other mechanism. All the DUs can be configured to support inter O-DU CA as spectrum aggregation, and are configured with a transport mechanism to exchange message with each other.

Each DU can be configured to, on bring up, read a configuration defined for the other DUs, calculate a latency introduced due to introduction of the other DU and establish the link with each other that will be used later for Scell addition and data transfer. At Scell addition, the DUs can be configured to exchange for example, a cell list, UE_ID, CRNTI, Tunnel ID, Wait For Status timer, configuration parameter, and so on. If link establishment or Scell addition fails, the DUs are configured to inform the peer entity. On successful link establishment, sDU will send success response to pDU with UE-ID, CRNTI, Cell list, and other IEs.

Each DU can be configured to calculate the latency introduced due to introduction of other DU.

The system can be configured to, on bring up, read the configuration defined for other DUs. Each DU can be configured to connect with the other DUs via any of the transport mechanisms above. DUs are configured to establish the link with each other, which can be used later during data transfer. At this link establishment procedure, DUs can be configured to exchange the cell list, and other configuration parameters of each other and, in case of establishment failure, DUs can be configured to inform the peer entity.

A DU on reception of addition of a cell from other DU for spectrum aggregation can be configured to establish the link with other DUs. In this procedure, DU can be configured to exchange the UE related information with other DUs, for example, UE-ID, CRNTI, 5QI, RLC Configuration, LC Configuration, MAC Configuration, PUCCH Configurations, and so on.

The DU on reception of addition of a cell from other DU for spectrum aggregation, can be configured to do admission control for the UE. if the sDU cannot handle the UE, send a failure message to the pDU; and if the sDU cannot handle any UE, the sDU is configured to send a failure message to the pDU that it cannot handle any UE, and the pDU is configured to be able to reject the addition of Cells from the sDU if the sDU cannot handle any UE. If the UE can be allowed in the DU, the UE can be configured to successfully indicate the completion of procedure to the DU that initiated the procedure. The DU can be configured to share configuration parameters in this confirmation, including CRNTI, UE-ID, PUCCH resources, and so on. The DU also is also configured to identify the time for which pDU can be configured to wait before considering that data is lost between DUs. In case UE is not admissible, sDU can be configured to inform failure to pDU.

A secondary DU (sDU) can be configured to indicate to primary DU, if it cannot handle any UE. The primary DU can be configured to be able to reject the addition of Cells from this DU for spectrum aggregation if the secondary DU cannot handle any UE.

A primary DU (pDU) can be configured to inform a secondary DU about addition of another new Cell for spectrum aggregation for the same UE.

The primary DU can be configured to inform secondary DU about activation/deactivation of Cells that were selected for spectrum aggregation for a UE.

The primary DU can be configured to be able to inform the secondary DU about deletion of the UE. At this point, secondary DU can be configured to clear the context for the UE.

The primary DU and secondary DU can establish the tunnel for a user related message exchange at DU level. The tunnel can be established when first cell is added for any UE towards secondary DU for spectrum aggregation. This tunnel can be used by primary DU to receive message from secondary DU.

The secondary DU can be configured to establish the tunnel for user related messages from primary DU. This tunnel can be established when first cell is added for any UE towards secondary DU for spectrum aggregation. This tunnel can be used by secondary DU to receive a message from primary DU.

A primary DU and secondary DU can be configured to use the same tunnel ID that was established at the time of first UE setup, for subsequent UEs as well for a pair of secondary DU and primary DU.

A pDU can be configured to combine APIs intended for same sDU for multiple UEs in single API and send it to sDU on the tunnels established at the time of a first UE addition.

A sDU can be configured to combine the APIs intended for same pDU for multiple UEs in single API and send it to sDU on the tunnels established at the time of a first UE addition.

The pDU can be configured to share the F1U tunnel information, received from CU, with sDU. The sDU can send the UL data directly to CU instead of sending it via pDU.

The sDU can be configured to share the F1U tunnel information with pDU in successful completion of Scell addition procedure for a UE. The pDU can send the same to CU. This Tunnel ID can be used by CU to send data directly to sDU.

The secondary DU can be configured to not initiate a F1AP connection with CU if it is acting as only SCELL DU and not hosting any PCELL.

The secondary DU can be configured to establish the tunnel to receive DL data from CU directly even if it is acting as only SCELL DU and not hosting any PCELL.

The PCELL MAC module can be configured to share the available buffer information with sDU MAC modules for DL data transfer for a UE.

The sDU MAC module can be configured to request for the data from PCELL MAC module once UE is scheduled in SCELL for data transfer or when the sDU MAC needs it.

The sDU MAC module can be configured to share the timing information SFN, Slot, and so on, with PCELL MAC, where UE is getting scheduled.

The sDU MAC module can be configured to share the TBSize, PUCCH resources information, DCI CCE information and other configuration parameters for data transfer on the SFN/Slot mentioned to PCELL MAC.

The PCELL MAC module can be configured to allocate the PUCCH resources, using the timing information and DCI information provided by sDU MAC, for HARQ feedback for data transmitted on SCELL.

The PCELL MAC module can be configured to share the data for each logical channel the TB of size provided by sDU MAC, wherein a primary DU and secondary DU can be configured to use the same tunnel ID that was established at the time of first UE setup, for subsequent UEs as well for a pair of secondary DU and primary DU. The PCELL MAC can be configured to inform sDU MAC about the available BO to be transmitted on sDU MAC.

The PCELL MAC can be configured to maintain a timer to wait for data request from sDU MAC for the BO intended for SCELL. After timer expiry, PCELL MAC can be configured to re-calculate the BO for Scells again and update SCells also on the same.

The PCELL MAC module can be configured to share the data as well as the PUCCH resources with peer DU MAC.

The PCELL MAC module can be configured to receive the PUCCH data from UE and forwards it to sDU MAC module for handling.

The sDU MAC module can be configured to inform the data transfer status with PCELL MAC module.

The sDU MAC can be configured to request PCELL MAC for PUCCH resources only, in case of HARQ NACK or DTX.

A RRE MAC module can be configured to receive data from pDU to transmit for supporting CoMP.

The RRE MAC module can be configured to receive PUCCH information from pDU to transmit for supporting CoMP.

Each O-DU can be configured to update O-CU about the cells from the other O-DU, with which the O-DU has a D2 relationship and thus can configure the cells from the other O-DU for functionalities including CA, DSS, and so on, and the O-DU can use a special value of RAN Area Code for each cell from the other O-DU about which it informs to the O-CU. The O-CU can be configured to interpret, based on the update, that the O-DU is not directly serving these cells but is responsible for configuring these cells via the inter-DU D2 relationship for functionalities such as CA, DSS, CoMP, etc.

Each DU can be configured to maintain a timer when starting the procedure for peer DU. On expiry of the timer, procedure can be configured to be considered as failure.

A system for counters and KPIs related to inter vDU spectrum aggregation is disclosed.

A system and method for messages and its content to support the inter vDU carrier aggregation/spectrum aggregation to increase the capacity, user throughput and cell coverage.

In an implementation, described is a system comprising:
- a group comprising a plurality of O-DUs configured to communicate with a set of UEs, wherein the O-DUs are configured to include an interface between each of the DUs in the group to support inter vDU carrier aggregation and spectrum aggregation.

The DUs can be configured to have an SCTP connection for the interface.

In the system, any message for an interface between the DUs comprises a Transaction ID IE and a Message Type IE. A D2 interface is given as an example, however the message can be configured for any interface between DUs. The DUs in the group can be configured to exchange messages comprising, for example, a Setup request (e.g. a D2 Setup Request), Setup Response and Setup Failure message with each other. A message for the interface (e.g.: D2) can comprise a Served Cell Information List IE for all the cells supported by the DU IE; a Start CRNTI IE; and an End CRNTI IE. The Setup Failure message comprises a cause IE. A DU-DU Link Release message or a Release Request can contain a cause.

A sDU of the group of DUs can be configured to, on reception of UE Addition request or any other message for Scell addition for a UE from another DU in the group, send, for example, a UE addition response or like message including a UE-ID, a CRNTI, an sDU GTP Tunnel Endpoint, and a time (T) wait for a status value. An sDU of the group of DUs can be configured to, on reception of UE Addition request or any other message for Scell addition for a UE from another DU in the group, send a UE failure response to a pDU of the group when there is a failure. A pDU of the group of DUs can be configured to, on reception UE Context deletion/UE Context modification message, send a UE or Scell Deletion request to a sDU of the group of DUs. The sDU of the group of DUs can be configured to, on reception of a Scell Deletion from a pDU of the group of DUs, send UE Deletion Response message to the pDU of the group of DUs. The pDU of the group of DUs can be configured to send a UE Configuration Update Request to inform the sDU of the group of DUs about an activation/deactivation/deletion of one of its cells. The sDU of the group of DUs can be configured to, on reception of a Configuration update request from a pDU of the group of DUs, sends a Configuration update response message back to the pDU in case of successful completion of procedure. The sDU of the group of DUs can be configured to, on reception of a Configuration update request from a pDU of the group of DUs, send a Configuration failure message back to the pDU in case of a failure of procedure. The DU of the group of DUs can be configured to send a UE Configuration Update Required message to a pDU of the group of DUs. The pDU of the group of DUs can be configured to send a Configuration Update Confirm message to inform the sDU the successful modification in response to the UE Configuration Update Request. The pDU of the group of DUs is configured to use a UE BO Update procedure to inform an sDU of the group of DUs about a buffer occupancy of a UE that needs to be transferred in the SCELL. The sDU of the group of DUs can be configured to send any data request message, for example, UE GET DATA REQUEST message to a pDU of the group of DUs to get data and PUCCH resources for a transmission. The pDU can be configured to, on reception of the data request message (e.g.: UE GET DATA REQUEST) from the sDU, sends a data transmission to the sDU via a DL DATA INDICATION message. The pDU can be configured to send a data indication request message to send UCI information to a sDU, for example a UE UCI DATA INDICATION message, to a sDU of the group of DUs for informing the PUCCH information received for a UE. The sDU is configured can be indicate a status of transmitted data to the pDU.

DETAILED DESCRIPTION OF THE IMPLEMENTATIONS

Figure 1:
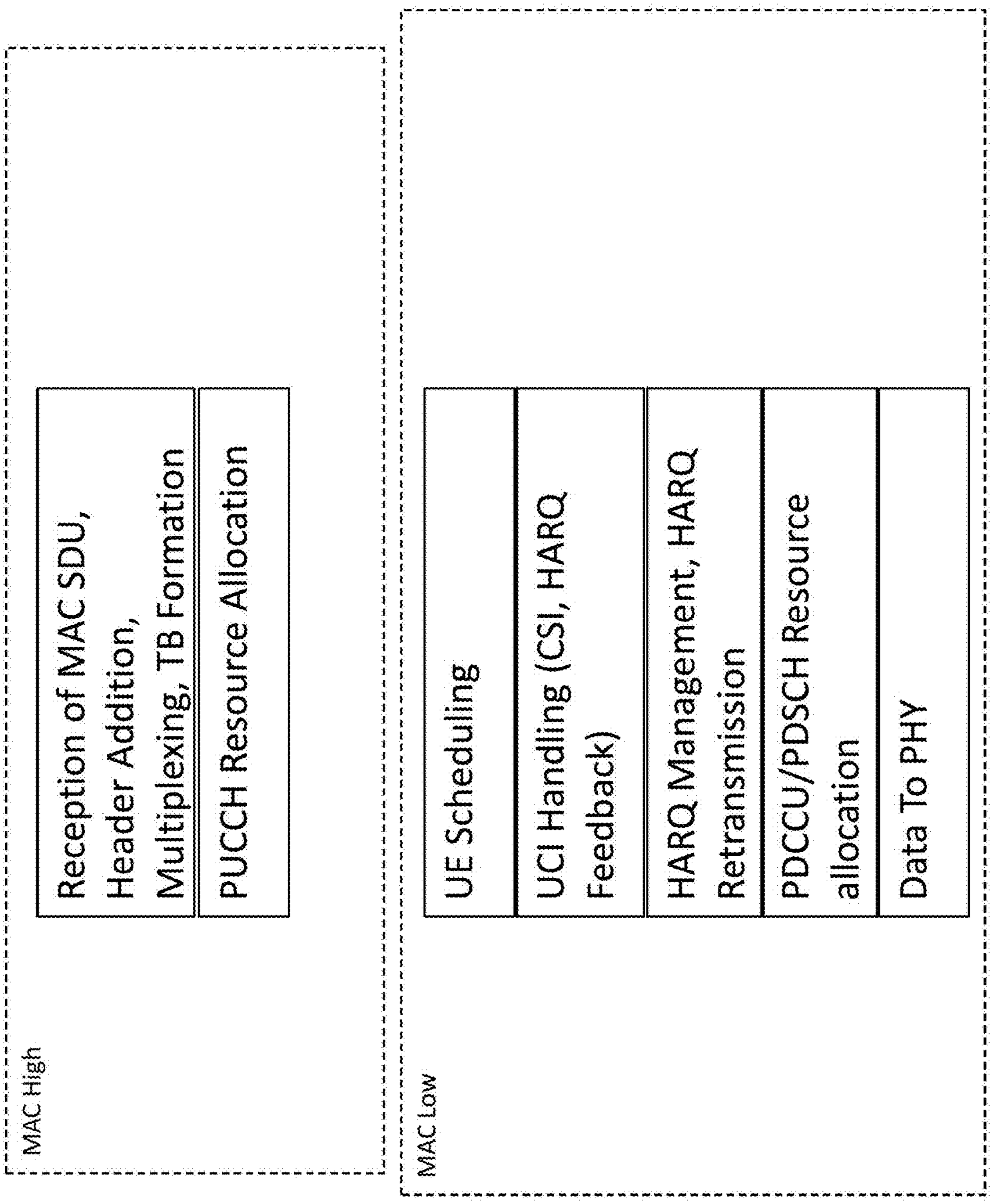
FIG. 1 is a diagram illustrating broad level functional distribution and activities performed by MAC in DU.

Reference is made to Third Generation Partnership Project (3GPP) and the Internet Engineering Task Force (IETF) in accordance with embodiments of the present disclosure. The present disclosure employs abbreviations, terms and technology defined in accord with Third Generation Partnership Project (3GPP) and/or Internet Engineering Task Force (IETF) technology standards and papers, including the following standards and definitions. 3GPP and IETF technical specifications (TS), standards (including proposed standards), technical reports (TR) and other papers are incorporated by reference in their entirety hereby, define the related terms and architecture reference models that follow.

Acronyms

3GPP: Third generation partnership project
5QI: 5G Quality of Service (QOS) Identifier
BS: Base Station
BO: Buffer Occupancy
CA: Carrier Aggregation
CDR: Charging Data Record
CoMP: Coordinated Multi-Point
C-plane: Control plane
C-RAN: cloud radio access network
CRNTI: Cell RNTI
CSI: channel state information
CU: Central unit
DCI: downlink control indicator
DL: downlink
DRAN: Distributed RAN
DSS: Dynamic Spectrum Sharing
DTX: Discontinuous transmission
DU: Distribution unit
eNB: Evolved Node B (applies to LTE)
eGTP: Evolved GTP
FDD: Frequency-division duplex
FH: Fronthaul
gNB: g NodeB (applies to NR)
GTP: General Packet Radio Switching (GPRS) Tunneling Protocol
HARQ: hybrid automatic repeat request
LTE: long term evolution
LTE-A: LTE Advanced
MAC: Media Access Control
MRDC: Multi-RAT Dual Connectivity
PBCH: Physical Broadcast Channel
PCELL or pDU: Primary Cell
PCFICH: Physical Control Format Indicator Channel
PDCCH: Physical downlink Control Channel
PDCP: Packet Data Convergence Protocol
PDSCH: physical downlink shared channel
PHICH: Physical Hybrid ARQ Indicator Channel
PUCCH: Physical Uplink Control Channel
PUSCH: Physical Uplink Shared Channel
PRACH: physical random access channel
RF: radio frequency interface
RLC: Radio Link Control
RNTI: Radio Network Temporary Identifier
RPC: Reduced Partial CDR
RRE: Remote Radio Equipment
SCELL or sDU: Secondary cell
SCTP: Stream Control Protocol Transmission
SFN: System Frame Number
TB: transport block
T-RNTI: Temporary
TTI: Transmission Time Interval
TDD: Time division duplex
U-plane: User plane
UCI: Uplink Control Information
UE: user equipment
UL: uplink
vBBU: Virtualized baseband unit
vDU: Virtual DU
VNF: Virtual Network Function

Definitions

Channel: the contiguous frequency range between lower and upper frequency limits.

DL: DownLink: data flow towards the radiating antenna (generally on the LLS interface)

LLS: Lower Layer Split: logical interface between O-DU and O-RU when using a lower layer (intra-PHY based) functional split.

M-Plane: Management Plane: refers to non-real-time management operations between the O-DU and the O-RU O-CU: O-RAN Control Unit—a logical node hosting PDCP, RRC, SDAP and other control functions O-DU: O-RAN Distributed Unit: a logical node hosting RLC/MAC/High-PHY layers based on a lower layer functional split.

O-RU: O-RAN Radio Unit: a logical node hosting Low-PHY layer and RF processing based on a lower layer functional split. This is similar to 3GPP's "TRP" or "RRH" but more specific in including the Low-PHY layer (FFT/iFFT, PRACH extraction).

OTA: Over the Air

S-Plane: Synchronization Plane: refers to traffic between the O-RU or O-DU to a synchronization controller which is generally an IEEE 1588 Grand Master (however, Grand Master functionality may be embedded in the O-DU).

U-Plane: User Plane: refers to IQ sample data transferred between O-DU and O-RU

UL: UpLink: data flow away from the radiating antenna (generally on the LLS interface)

Names and labels of data messages and parameters given herein can include any equivalent data messages that execute the function described by the name.

The present disclosure provides embodiments of systems, devices and methods for Radio Access Networks and Cloud Radio Access Networks.

Figure 10:
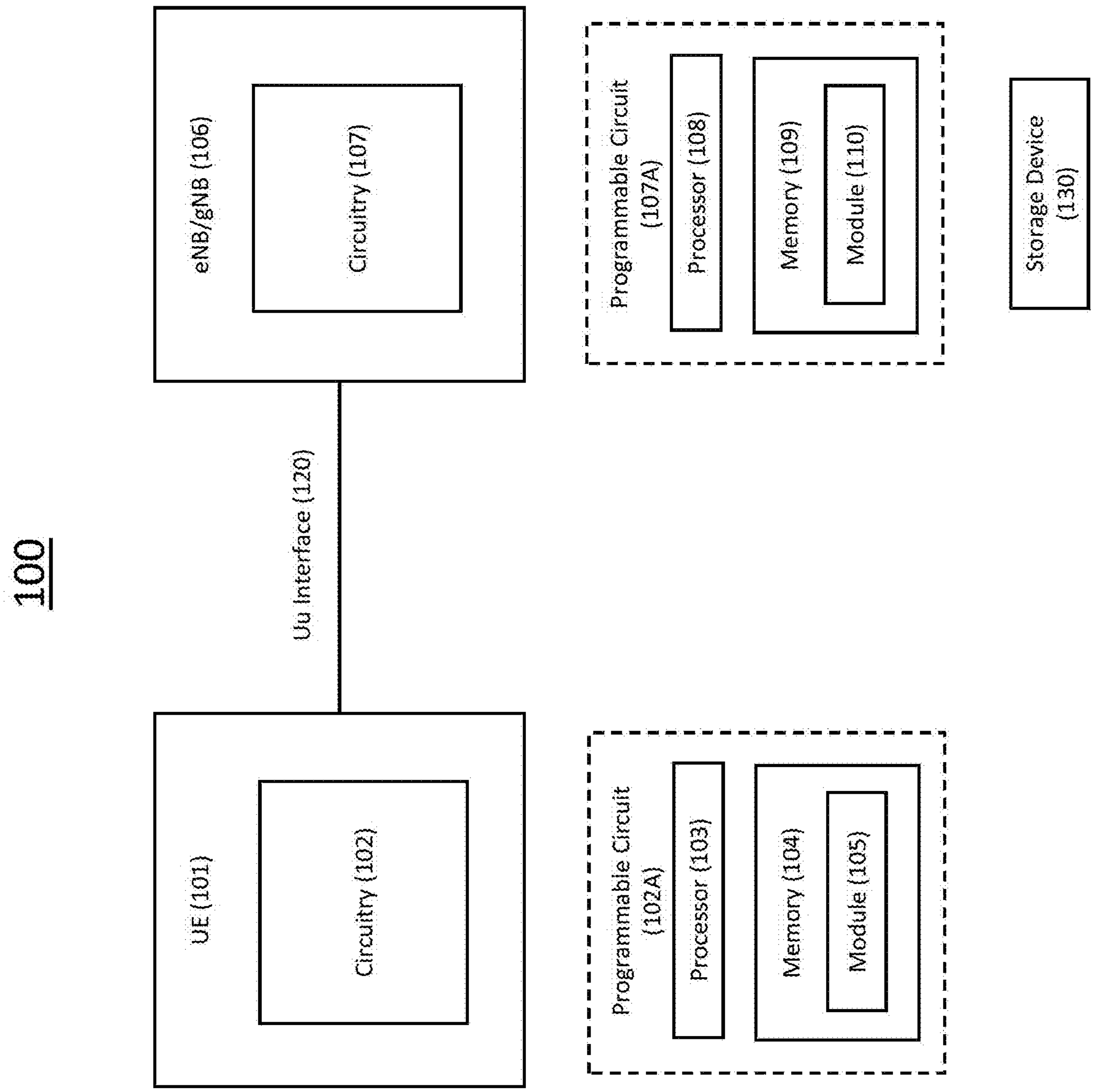
FIG. 10 is a block diagram of a system architecture.

FIG. 10 is a block diagram of a system 100. System 100 includes a UE 101, a gNB/eNB 106. The UE and eNB/gNB are communicatively coupled via a Uu interface 120.

UE 101 includes electronic circuitry, namely circuitry 102, that performs operations on behalf of UE 101 to execute methods described herein. Circuity 102 may be implemented with any or all of (a) discrete electronic components, (b) firmware, and (c) a programmable circuit 102A.

eNB/gNB 106 includes electronic circuitry, namely circuitry 107, that performs operations on behalf of eNB/gNB 106 to execute methods described herein. Circuity 107 may be implemented with any or all of (a) discrete electronic components, (b) firmware, and (c) a programmable circuit 107A.

Programmable circuit 107A, which is an optional implementation of circuitry 107, includes a processor 108 and a memory 109. Processor 108 is an electronic device configured of logic circuitry that responds to and executes instructions. Memory 109 is a tangible, non-transitory, computer-readable storage device encoded with a computer program. In this regard, memory 109 stores data and instructions, i.e., program code, that are readable and executable by processor 108 for controlling operations of processor 108. Memory 109 may be implemented in a random-access memory (RAM), a hard drive, a read only memory (ROM), or a combination thereof. One of the components of memory 109 is a program module, namely module 110. Module 110 contains instructions for controlling processor 108 to execute operations described herein on behalf of eNB/gNB 106.

The term "module" is used herein to denote a functional operation that may be embodied either as a stand-alone component or as an integrated configuration of a plurality of subordinate components. Thus, each of module 105 and 110 may be implemented as a single module or as a plurality of modules that operate in cooperation with one another.

While modules 110 are indicated as being already loaded into memories 109, and module 110 may be configured on a storage device 130 for subsequent loading into their memories 109. Storage device 130 is a tangible, non-transitory, computer-readable storage device that stores module 110 thereon. Examples of storage device 130 include (a) a compact disk, (b) a magnetic tape, (c) a read only memory, (d) an optical storage medium, (e) a hard drive, (f) a memory unit consisting of multiple parallel hard drives, (g) a universal serial bus (USB) flash drive, (h) a random-access memory, and (i) an electronic storage device coupled to eNB/gNB 106 via a data communications network.

Uu Interface (120) is the radio link between the UE and eNB/gNB 106, which is compliant to the LTE or 5G specifications.

As of the present disclosure, described are systems and methods for data exchange between 2 DUs for supporting inter vDU carrier aggregation to enhance the DL throughput. Considering the 3GPP design, in this approach MAC is configured to be responsible for data transfer, keeping RLC as transparent. Carrier aggregation within DU is defined in 3GPP specification. The present disclosure describes implementations of a procedure so that data transfer between these 2 DUs can be taken care without involvement of UE or CU.

Described are implementations of a method and a system to support the user data transfer as well as the PUCCH resource allocation and PUCCH data transfer for a user between different DUs at MAC level. RLC are transparent and are present only in a CELL (pDU) to which the UE is attached. FIG. 1 illustrates the broad level functional distribution and activities performed by MAC in DU.

MAC will be considered as divided into 2 parts:

1. MAC High: It only resides in the cell to which the UE is attached (hereafter "pDU" or "PCELL"). Other cells that can provide CA, or CoMP are called "sCELL" or "sDU" herein. Part of MAC that receives data from RLC layer to form the TB and send it across to scheduler for transmission. It also receives PUCCH information on pDU for sDU and send it to sDU MAC.
2. MAC Low: Scheduler part of MAC which will reside on pDU as well as on sDU. It will take the independent decision of UE scheduling as per its algorithm. It will calculate the TBSize based on the current channel quality and TB available. Same will be provided to MAC High to get the RLC PDUs for transmission.

In implementations, pDU informs sDU about the buffer occupancy of available data that need transmission on SCELL. The pDU will run its algorithm to calculate the data that needs to be transmitted on SCELL/RRE. Once sDU schedules the UE, it requests the pDU to send the data and PUCCH resources. The sDU indicates the TB size for each logical channel so that pDU can concatenate the RLC PDUs and send data to sDU. PUCCH resources will be used by sDU while encoding the DCI for transmission.

Figure 2:
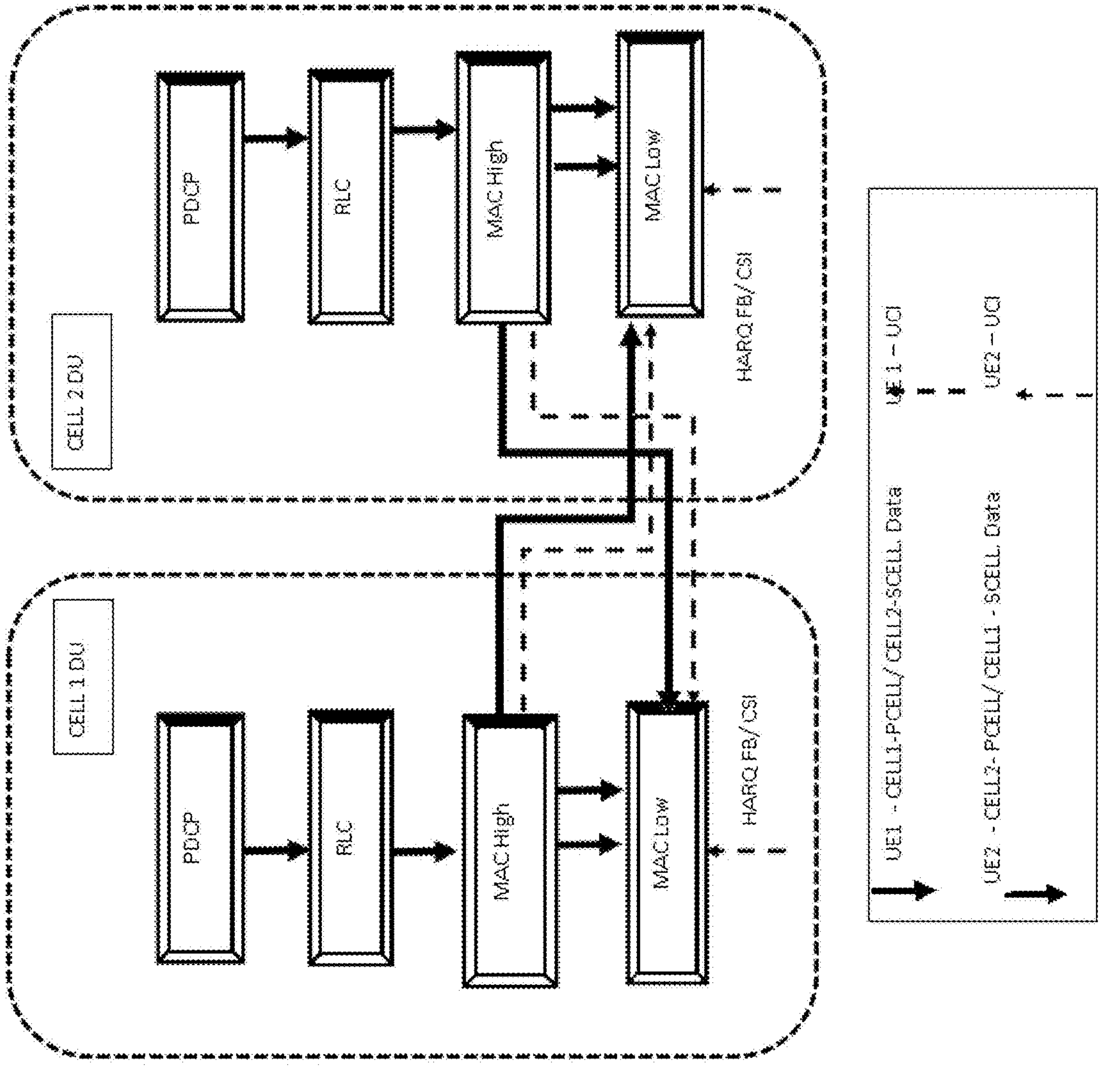
FIG. 2 shows an exemplary data flow between the PCELL DU (pDU) and SCELL DU (sDU) for different UEs.

FIG. 2 shows an exemplary data flow between the pDU and SCELL/RRE DU (sDU) for different UEs. As noted herein, names and labels of data messages and parameters given herein (e.g.: UE Addition Request/Response/Failure, Data Request, and so on) can include any equivalent data messages that execute the function described by the name or label. Both the cells have UEs for which it is acting as pDU as well for some other UE, where it is acting as SCELL/RE. In this flow, it indicates the data flows from MAC Low to MAC High then goes to RLC and PDCP if it is pDU. For SCELL/RRE, data is sent from MAC Low of sDU to MAC High of pDU and then to RLC/PDCP of pDU.

Figure 3:
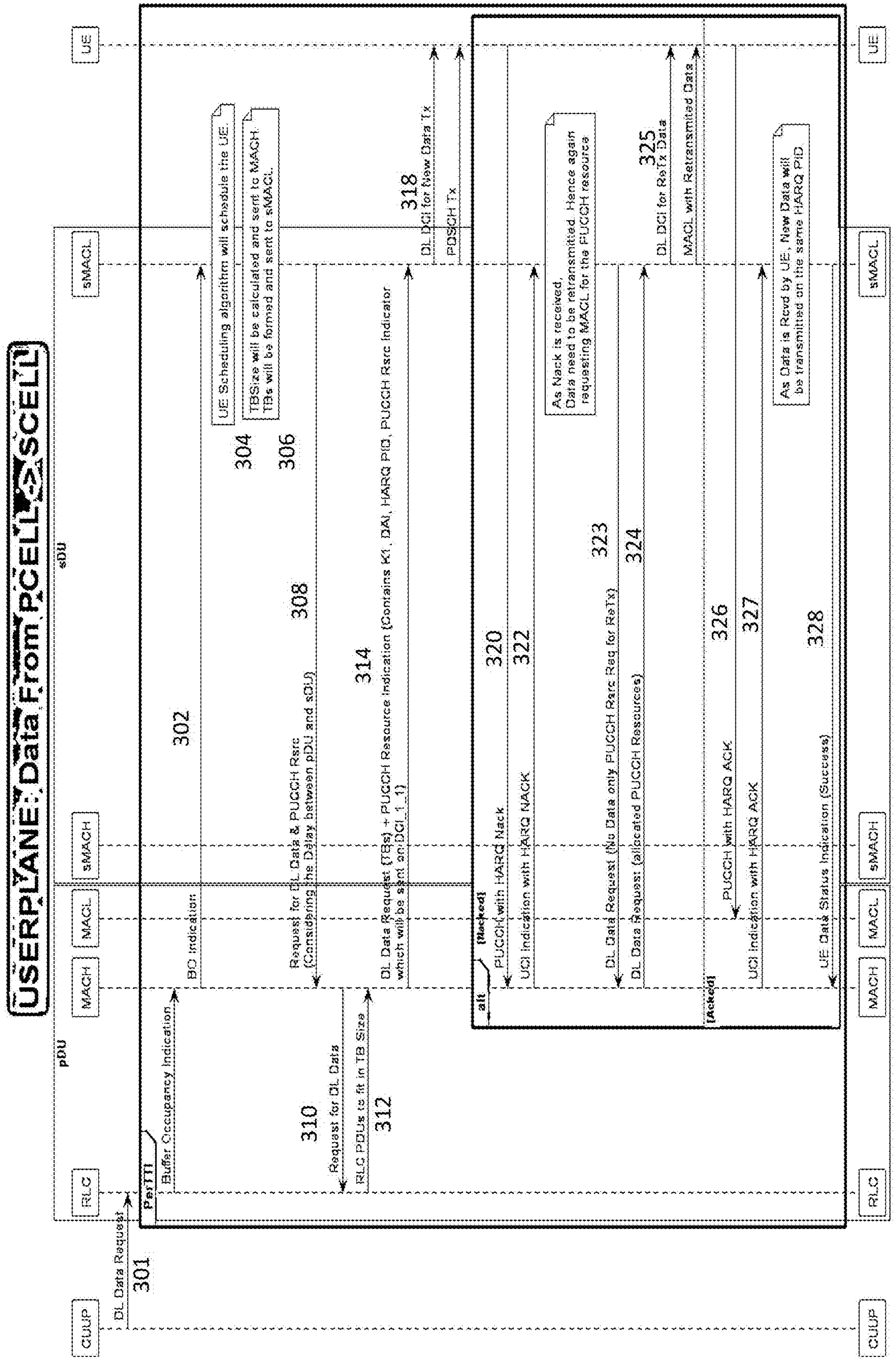
FIG. 3 shows a data flow sequence pDU and sDU for a UE.

A data flow sequence for a pDU and a sDU for a UE is shown in FIG. 3. As shown in FIG. 3:

At block 301 CUUP makes a DL Data Request to pDU.

At block 302 pDU generates and sends a BO Indication to sDU for informing about the data availability.

At block 304 the sDU can determine the UE scheduling as per the scheduler algorithm implemented. At block 306, sDU also calculates the transport block size for each logical channel that can be transmitted on the SFN, and the Slot where UE is to be scheduled.

Once sDU can schedule the UE, at block 308 requests pDU for the data. It informs TB size for each logical channel, SFN and Slot to pDU. The sDU calculates the maximum time which pDU is to wait before considering data transmission failure from sDU.

The pDU is aware of the sDU configuration (TDD or FDD and TDD pattern). Based on this information as well as on the received SFN/Slot, pDU allocates the PUCCH. At block 310, pDU sends the received Transport block size to RLC, so that at block 312 RLC can send the PDUs sufficient to fill the MAC PDU.

At block 314, pDU sends the TB along with PUCCH resources to sDU. The sDU allocates the PDCCH resources for the UE and encodes the DCI it supports. At block 316, the sDU then transmits DCI followed by the PDSCH Tx data to UE.

At block 320, pDU MAC receives the PUCCH for UE for both pDU as well as SCELL/RRE. Once same is received, at block 322 MAC High of pDU sends the same to MAC Low of sDU, and sDU takes action on the received PUCCH message.

If the received PUCCH message in sDU is only for CSI, at block 318 sDU updates CQI, PMI, RI, and so on.

In case of HARQ Nack reception at block 322, at block 324 sDU again requests for PUCCH resource for retransmission. At this point, at block 324, pDU allocates and sends only PUCCH resources for sDU as data is already available at sDU. If after a max retransmission of TB at block 325, if HARQ ack is not received, sDU will indicate the failure to pDU.

If the received PUCCH message contains HARQ feedback, based on the received feedback, at block 326 sDU informs pDU. If at block 327, a HARQ Ack is received, at block 328 sDU informs the successful transmission of data to pDU.

Figure 4:
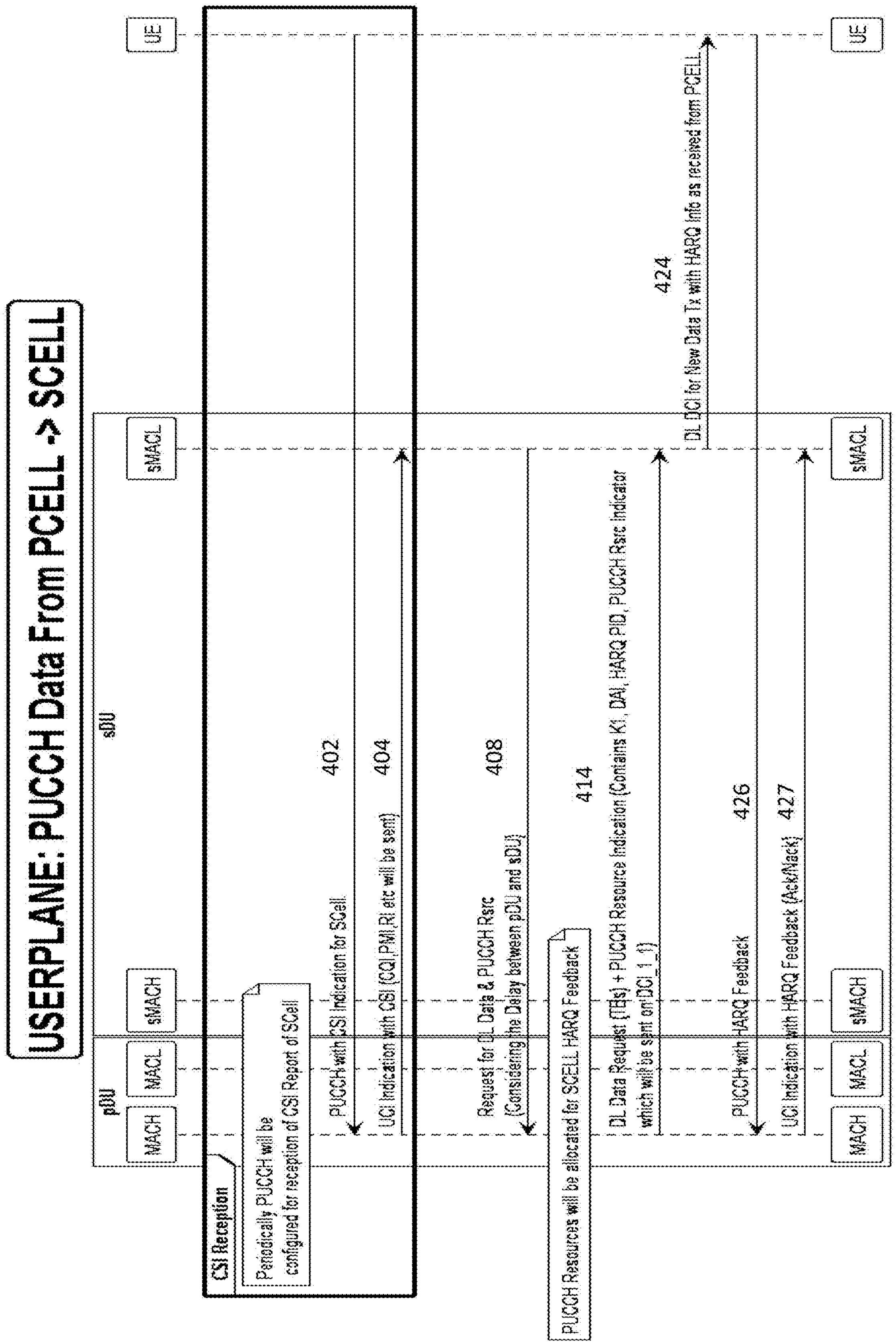
FIG. 4 is a diagram for indicating a PUCCH information exchange.

A PUCCH message transfer between pDU and sDU is shown in FIG. 4. Periodically PCCU can be configured for reception of CSI Report for the SCell. At block 402, the pDU MAC receives the UL Control information which can contain CSI or HARQ feedback. At block 404, the pDU then forwards the same to sDU MAC to handle the same. At block 408 sDU requests pDU for the DL and PUCCH resource data. It informs Transport block size, SFN and Slot to pDU along with the PUCCH Resource Indication. At block 424, where the received PUCCH message contains HARQ feedback, based on the received feedback, at block 42 sDU informs pDU. At block 327, a HARQ Ack/Nack is sent back to sDU.

An exemplary advantage of the implementations described herein are that the configuration requires no changes in the 3GPP defined procedures to support the inter DU CA. As such, DUs with different capabilities can work together to provide better user experience.

Another exemplary advantage is that implementations as described herein optimally leverage the carrier aggregation on downlink between DUs for enhancing the user throughput. Information does not have to be transmitted to UE, and hence is transparent to UE.

In another implementation, UE bundling can be done so that a pDU/sDU sends messages for multiple UEs intended for same sDU/pDU in single API. If there is only one UE connected to sDU, this API can include a message for the single UE. If else, a number of messages can increase according to the pending messages.

Figure 5:
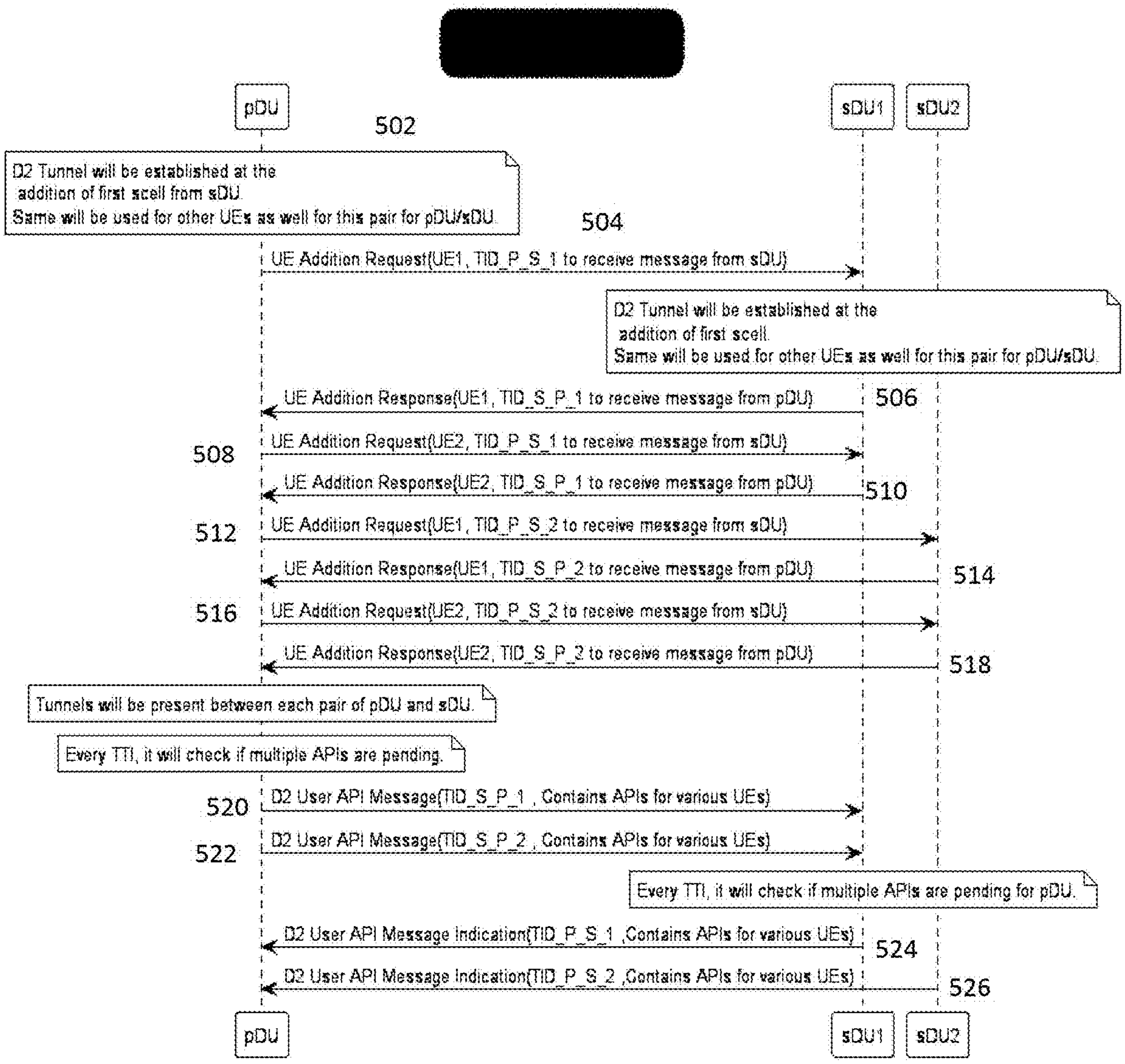
FIG. 5 shows an exemplary flow for an API Bundling sequence between a pDU and a sDU for multiple UEs.

FIG. 5 shows an exemplary flow for an API Bundling sequence between the pDU and sDU for multiple UEs.

More specifically,

At the time of first UE connection between a pair of sDU and pDU, a GTP tunnel is established for exchange of data related messages between pDU and sDU.

A Tunnel ID for pDU end and sDU end is exchanged in a message, for example, a UE Addition Request/Response message or any other message.

If Tunnel ID changes in future, same is exchanged again in D2 Modification Request/Required procedure.

pDUs and sDUs, for each TTI, it will bundle all the pending APIs and send it to peer.

As shown in FIG. 5, a pDU: D2 (GTP) Tunnel is established at the addition of a first scell from sDU. At the time of first UE connection between a pair of sDU and pDU, at block 502 a D2 tunnel is established for exchange of data related messages between pDU and sDU.

At block 504, the pDU sends the DU1 an UE function message, for example, a UE Addition Request (UE1, TID_P_S_1 to receive message from sDU). A DU1 a D2 Tunnel is established at the addition of a first scell. The same is used for other UEs as well for this pair for pDU/sDU.

At block 506, the sDU1 sends the pDU a UE Addition Response (UE1, TID_S_P_1 to receive message from pDU).

At block 508, the pDU sends the DU1 an UE Addition Request (UE2, TID_P_S_1 to receive message from sDU).

At block 510, the sDU1 sends a pDU an UE Addition Response (UE2, TID_S_P_1 to receive message from pDU).

At block 512, the pDU sends DU2 a UE Addition Request (UE1, TID_P_S_2 to receive message from sDU).

At block 514, the sDU2 sends the pDU a UE Addition Response (UE1, TID_S_P_2 to receive message from pDU).

At block 516, the pDU sends the sDU2 a UE Addition Request (UE2, TID_P_S_2 to receive message from sDU).

At block 518, the sDU2 sends the pDU a UE Addition Response (UE2, TID_S_P_2 to receive message from pDU). At the pDU tunnels are present between each pair of pDU and sDU. For every TTI, the pDU checks if multiple APIs are pending.

At block 520, the pDU sends the DU1 a D2 User API Message (TID_S_P_1, comprises APIs for various UEs).

At block 522, the pDU sends the DU1 a D2 User API Message (TID_S_P_2, Contains APIs for various UEs).

At DU1, every TTI is checked to determine if multiple APIs are pending for pDU. At block 524, the sDU1 sends pDU a D2 User API Message Indication (TID_P_S_1, Contains APIs for various UEs).

At block 526, the sDU2 sends pDU a D2 User API Message Indication (TID_P_S_2, Contains APIs for various UEs).

Figure 6:
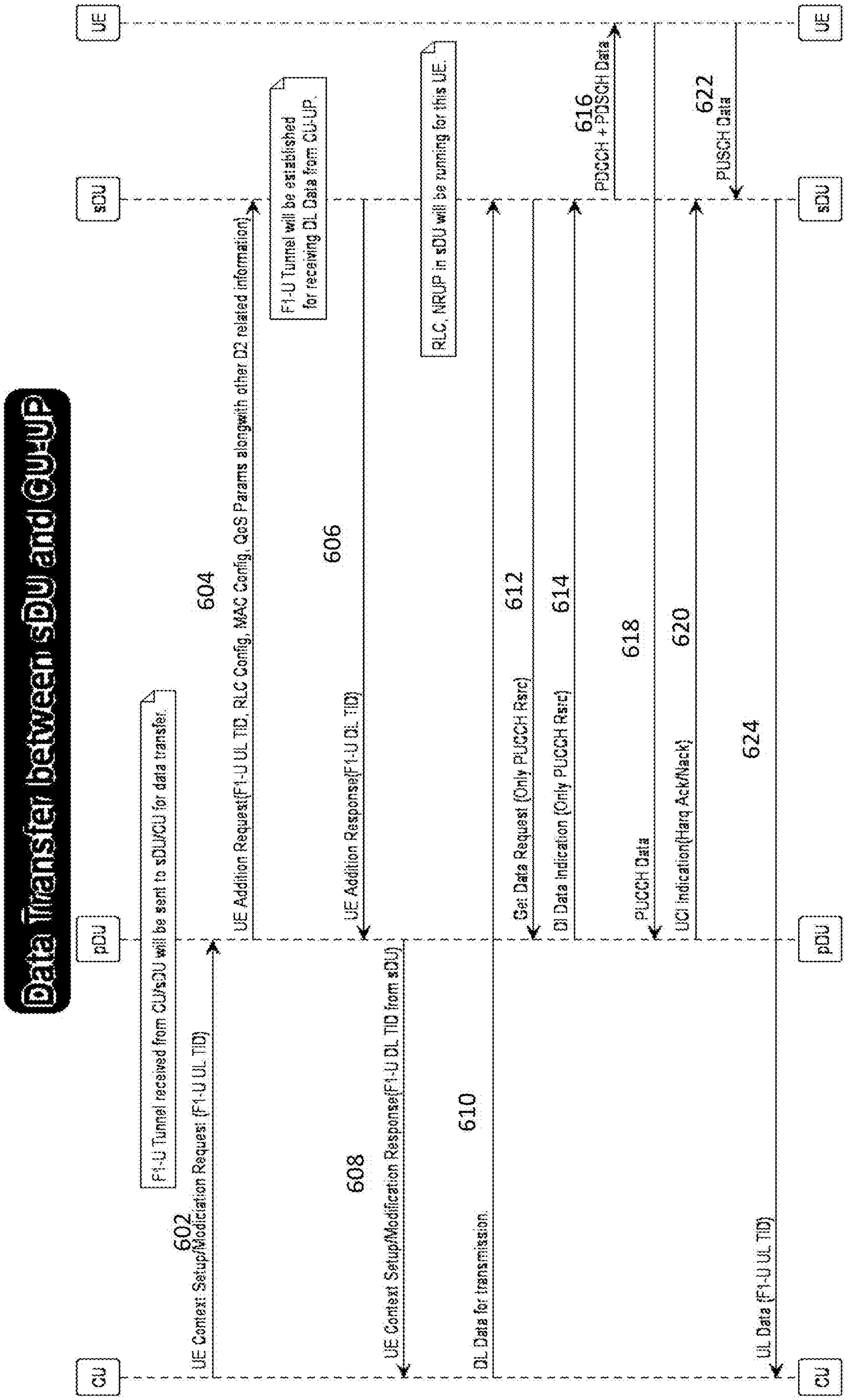
FIG. 6 shows an implementation of an exemplary message flow between a sDU, a pDU and a CU.

FIG. 6 shows another implementation of an exemplary message flow between sDU, pDU and a CU for direct CU-UP related data transfer to sDU to CU.

CU sends the UL F1-U Tunnel ID to receive UL data from DU. This is received by pDU and at block 604, pDU forward it to sDU so that sDU can send data directly to CU.

At the time of UE Addition between pDU and sDU, sDU establishes the DL F1-U TID. sDU will share the same with pDU, and pDU informs the CU for sending DL data directly to sDU. CL sends the DL data for transmission to sDU.

The pDU decides the direct data transfer between CU and sDU based on sDU capability or based on its loading condition.

At the pDU, an F1-U Tunnel received from CU/sDU, and at block 604, is sent to sDU/CU for data transfer. At block 602, the CU sends the pDU a UE Context Setup/Modification Request (F1-U UL TID).

At block 604, the pDU sends the sDU a UE Addition Request (F1-U UL TID, RLC Config, MAC Config, QoS Params along with other D2 related information). At the sDU, a F1-U Tunnel is established for receiving DL Data from CU-UP.

At block 606, the sDU sends the pDU a UE Addition Response (F1-U DL TID)

At block 608, pDU sends the CU a UE Context Setup/Modification Response (F1-U DL TID from sDU). At the sDU, a RLC, NRUP in sDU is running for this UE.

At block 610, the CU sends the sDU DL Data for transmission.

At block 612, the sDU sends the pDU a Get Data Request (Only PUCCH Rsrc).

At block 614, pDU sends the sDU a Dl Data Indication (Only PUCCH Rsrc).

At block 616, the sDU sends the UE PDCCH and PDSCH Data.

At block 618, the UE sends the pDU the PUCCH Data.

At block 620, the pDU sends the sDU a UCI Indication (Harq Ack/Nack).

At block 622, The UE-sends the sDU the PUSCH Data.

At block 624, the sDU-sends the CU UL Data (F1-U UL TID).

In an implementation, described is a cellular communication system comprising: a group of gNBs, O-DUs, O-CUs, O-RUs each with multiple sectors, communicating with the set of UEs. System can have, for example, a CRAN, DRAN architecture. Each O-CU/O-DU/gNB can be running in separate or the same servers and can be physically located at same or different places. These O-DUs support inter vDU carrier aggregation/spectrum aggregation. Hence interface between these DUs exist. It can be called as D2 interface, or any other name can be given.

Figure 7:
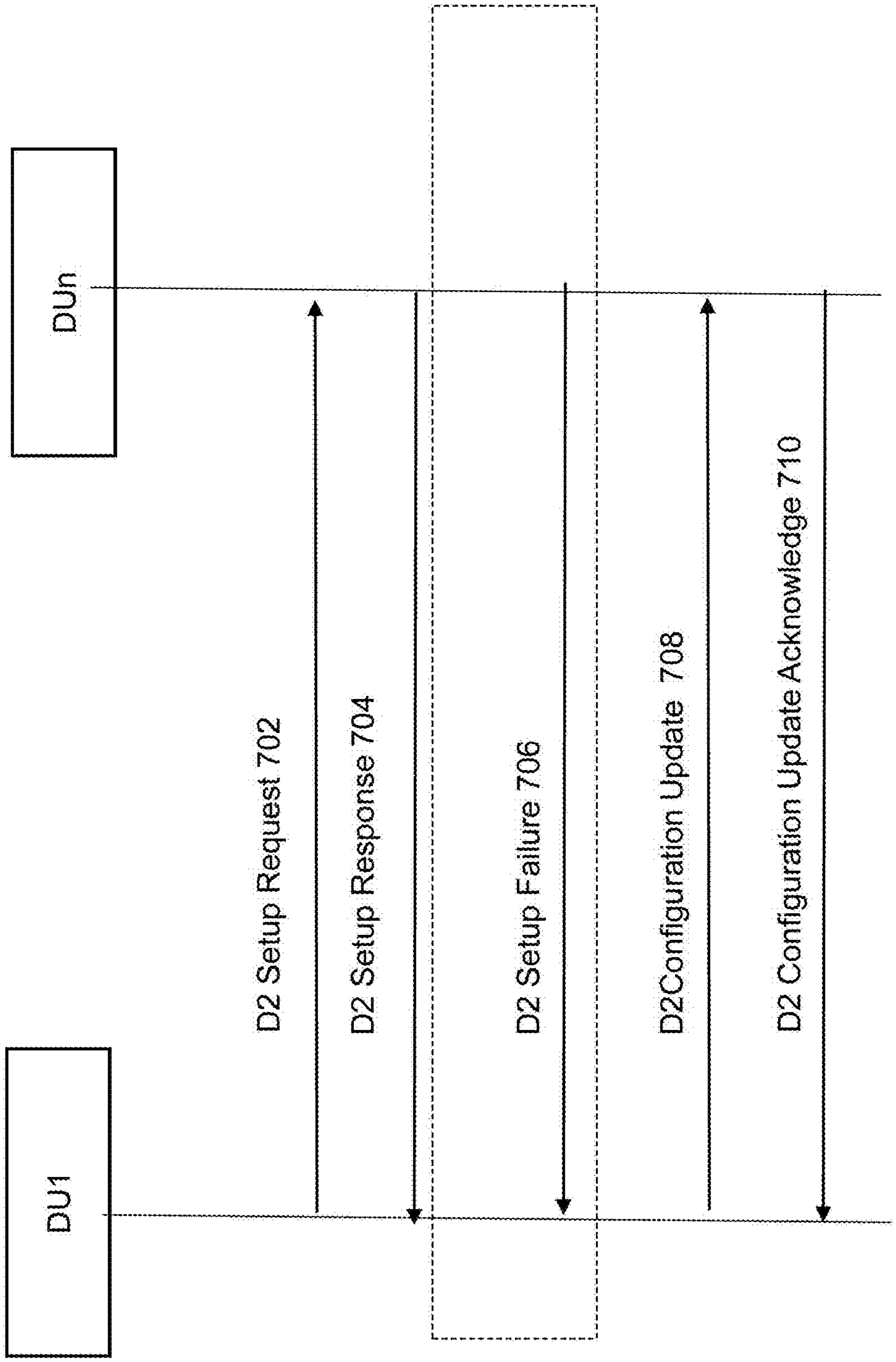
FIG. 7 shows a setup procedure between DUs for supporting inter vDU CA.

Accordingly, in an implementation, described are IEs that are present in the various messages shared between DUs for supporting inter vDU carrier aggregation/spectrum aggregation. FIG. 7 shows an implementation of a D2 setup procedure between the DUs for supporting inter vDU CA. As shown in FIG. 7, described is a flow for indicating link establishment between DUs. This procedure takes place before any UE is allowed to use Scell from neighboring DUs.

For supporting inter vDU CA/SA DUs can establish a connection the using SCTP connection. This message can be called as D2 Setup Procedure or DU-DU interface establishment procedure.

Each message on the DU-DU link or D2 interface can contain the following IEs.

Transaction ID: it will be an unsigned integer from 0 . . . 255.

Message Type: This field can be divided into 2 parts as defined below:

TABLE 1

| IE/Group Name Message Type | IE type and reference |
|---|---|
| >Procedure Code | INTEGER (0 . . . 255) |
| >Type of Message | CHOICE (Initiating Message, Successful Outcome, Unsuccessful Outcome, . . .) |

As shown in FIG. 7, DUs are configured to exchange a D2 Setup Request 702, a D2 Setup Response 704 and a D2 Setup Failure message 706 with each other. As will be appreciated, the message and message parameters given below are exemplary, and the messages can any other parameters. The DU-DU Link establishment message or configuration update message or D2 Setup Request/Response or D2 Configuration Update 708/D2 Configuration Update Acknowledge 710 can contain following IEs:

Served Cell Information List for all the cells supported by the DU
- NR CGI (NR Cell Global Identifier (NR CGI) is used to globally identify a cell)
- PCI (Physical cell identifier)
- ARFCN (Frequency index for the cell)
- gNB DU ID: ID of the gNB DU which is sending the message.
- NR Mode Info: to indicate if cell is working in FDD or TDD mode.
- DL Transmission Bandwidth: Includes subcarrier spacing and number of PRBS supported for DL transmission.
- UL Transmission Bandwidth: Includes subcarrier spacing and number of PRBS supported for UL transmission.
- Start CRNTI: Indicates the start CRNTI configured in the cell
- End CRNTI: Indicates the end CRNTI configured in the cell.

Other parameters.

TABLE 2

| IE/Group Name | IE type |
|---|---|
| gNB-DU ID | INTEGER (0 . . . $2^{36}-1$) |
| Served Cell Info List | For all the Scells supported by DU, list of information for Served Cell Info |
| >Served Cell Info | As Shown below |
| Start CRNTI | INTEGER (0 . . . 65535) |
| End CRNTI | INTEGER (0 . . . 65535) |
| [Name] . . . | [Type] . . . |

Served Cell Info

TABLE 3

| IE/Group Name | IE type and reference |
|---|---|
| NR CGI | As Shown Below |
| NR PCI | As Shown Below |
| NR ARFCN | INTEGER (0 . . . 3279165) |
| NR-Mode-Info | Indicates whether cell supports TDD of FDD duplexing capability |
| DL Transmission Bandwidth | As shown below |
| DL Transmission Bandwidth | As shown below |
| TDD Pattern | If NR-Mode-Info indicates the TDD duplexing capability, it will take TDD pattern supported by cell to peer DU. |
| [Name] . . . | [Type and reference] . . . |

NR PCI

TABLE 4

| IE/Group Name | Range | Semantics description |
|---|---|---|
| NR Cell Identity | Integer with value 0 . . . 1007 | Indicates Physical Cell ID |

NR CGI

TABLE 5

| IE/Group Name | IE type |
|---|---|
| PLMN Identity | OCTET STRING(SIZE(3)) |
| NR Cell Identity | BIT STRING (Size(36)) |

DL Transmission Bandwidth

TABLE 6

| IE/Group Name | IE Type and Reference | Semantics Description |
|---|---|---|
| NR SCS | ENUMERATED (scs15, scs30, scs60, scs120, . . .) | The values scs15, scs30, scs60 and scs120 corresponds to the sub carrier spacing in TS 38.104 |

TABLE 6-continued

| IE/Group Name | IE Type and Reference | Semantics Description |
|---|---|---|
| NRB | ENUMERATED (nrb11, nrb18, nrb24, nrb25, nrb31, nrb32, nrb38, nrb51, nrb52, nrb65, nrb66, nrb78, nrb79, nrb93, nrb106, nrb107, nrb121, nrb132, nrb133, nrb135, nrb160, nrb162, nrb189, nrb216, nrb217, nrb245, nrb264, nrb270, nrb273, . . .) | This IE is used to indicate the UL or DL transmission bandwidth expressed in units of resource blocks "$N_{RB}$" (TS 38.104 [17]). The values nrb11, nrb18, etc. correspond to the number of resource blocks "$N_{RB}$" 11, 18, etc. |

In an implementation, a DU-DU Link establishment failure message or D2 Setup failure can contain following IEs:

Cause: this can define the cause value for the failure of D2 Setup procedure. Few examples for it are mentioned here as type enumerations.

TABLE 7

| | |
|---|---|
| Abstract Syntax Error (Reject) | The received message included an abstract syntax error and the concerning criticality indicated "reject". |
| Abstract Syntax Error (Ignore And Notify) | The received message included an abstract syntax error and the concerning criticality indicated "ignore and notify". |
| Message Not Compatible With Receiver State | The received message was not compatible with the receiver state. |
| Semantic Error | The received message included a semantic error. |
| Abstract Syntax Error (Falsely Constructed Message) | The received message contained IEs or IE groups in wrong order or with too many occurrences. |
| Unspecified | Sent when none of the above cause values applies but still the cause is Protocol related. |
| Scell Down | SCell is down in DU |
| UE Not Allowed | Admission control failed in DU for some reason |
| Cell Overload | Cell is overloaded hence can not handle anymore UE. |

The DU-DU Link Release message or D2 Release Request can contain a cause IE as shown in Table 7.

Figure 8:
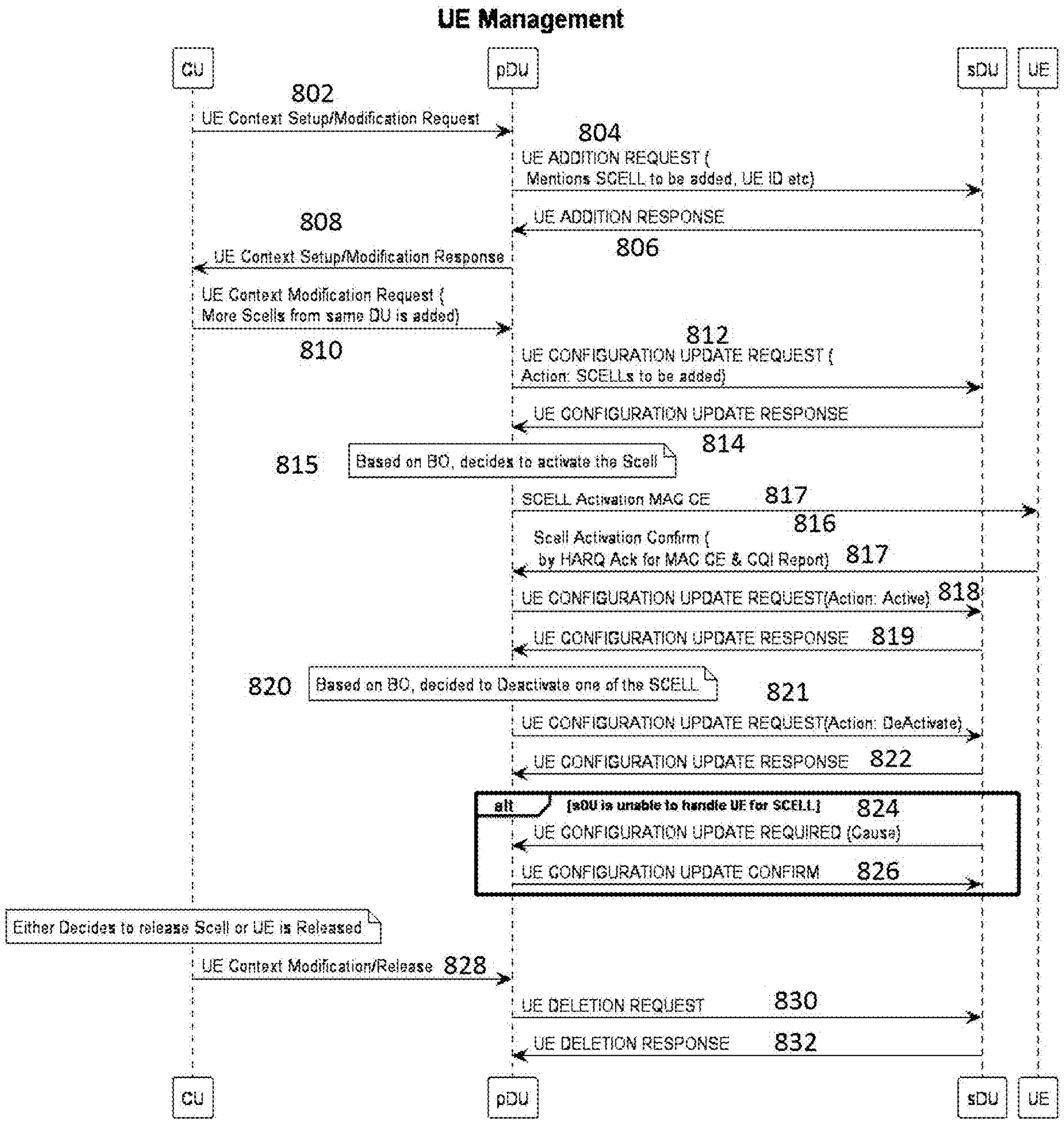
FIG. 8 shows an implementation of an exemplary flow for a UE addition/deletion procedure between DUs.

FIG. 8 shows an implementation of an exemplary flow for a UE addition/deletion procedure between DUs. As shown in FIG. 8, in an implementation at block 802 at the UE context establishment/modification procedure initiate by O-CU for adding Scell from other DUs, at block 804 pDU will initiate UE Addition procedure. It can be named by any other interface, but this procedure can share the UE information with a peer DU to add the Scell. Information shared in this procedure is described here. This information can be extended and can contain the same IEs as received in UE Context Setup/Modification Request message 802 from CU.

TABLE 8

| IE/Group Name | IE type and reference |
|---|---|
| SCell List | |
| >NR PCI | As mentioned in the Table 4. |
| UE-ID | INTEGER (0 . . . $2^{32}-1$) |
| CRNTI | INTEGER (0 . . . 65535) |
| DRB Info List | |
| >DRB Info Item | |
| >>DRB ID | INTEGER (1 . . . 32) |
| >>LC ID | INTEGER (1 . . . 32) |
| >> 5QI | INTEGER (0 . . . 255) |
| >>QoS Flow Level QoS Parameters | |
| >>QoS Flow Mapping Indication | |
| pDU GTP Tunnel Endpoint | As Shown below |

pDU GTP Tunnel Endpoint:

TABLE 9

| IE/Group Name | IE type and reference | Semantics description |
|---|---|---|
| Transport Layer Address | BIT STRING (1 . . . 160, . . .) | The Radio Network Layer is not supposed to interpret the address information. It should pass it to the Transport Layer for interpretation. For details, see TS 38.414. |
| GTP TEID | OCTET STRING (4) | For details and range, see TS 29.281. |

QoS Flow Level QoS Parameters

On reception of UE Addition request or any other message for Scell addition for a UE from other DU, at block 806 sDU is sends UE addition response with following IEs:

TABLE 10

| IE/Group Name | IE type and reference |
|---|---|
| UE-ID | INTEGER (0 . . . $2^{32}-1$) |
| CRNTI | INTEGER (0 . . . 65535) |
| sDU GTP Tunnel Endpoint | As Shown in Table 9 for pDU GTP Tunnel Endpoint. |
| $T_{waitForStatus}$. | INTEGER (0 . . . 255) |

At block 806 on reception of UE Addition request or any other message for Scell addition for a UE from other DU, in case of failure sDU sends UE addition failure with following IEs to pDU:

TABLE 11

| IE/Group Name | IE type and reference |
|---|---|
| UE-ID | INTEGER (0 . . . $2^{32}$ − 1) |
| CRNTI | INTEGER (0 . . . 65535) |
| Cause | As described with respect to Table 7 |

If Scell Deletion is requested by pDU due to reception of UE Context deletion/UE Context modification message at block 828, at block 830 pDU sends UE Deletion Request message to sDU. It can carry following information:

TABLE 12

| IE/Group Name | IE type and reference |
|---|---|
| UE-ID | INTEGER (0 . . . $2^{32}$ − 1) |
| CRNTI | INTEGER (0 . . . 65535) |

On reception of Scell Deletion by pDU, at block 832 sDU will send UE Deletion Request Response message to pDU. It carries the following information.

TABLE 13

| IE/Group Name | IE type and reference |
|---|---|
| UE-ID | INTEGER (0 . . . $2^{32}$ − 1) |
| CRNTI | INTEGER (0 . . . 65535) |
| Cause | As described with respect to Table 7 |

The pDU sends UE Configuration Update Request to inform sDU about Activation (block 818)/deactivation (block 821)/deletion (block 830) of one of its cells. After this procedure SCELL is available for data transfer for a UE. Following IEs are shared in this message:

TABLE 14

| IE/Group Name | IE type and reference |
|---|---|
| Associated SCell List | As mentioned below |
| UE-ID | INTEGER (0 . . . $2^{32}$ − 1) |
| CRNTI | INTEGER (0 . . . 65535) |
| pDU GTP Tunnel Endpoint | Table 9 for pDU GTP Tunnel Endpoint. |

Associated SCell List: this element can be present for the SCells that are getting modified. Each item can contain following information:

TABLE 15

| IE/Group Name | IE type and reference |
|---|---|
| >SCell ID | NR PCI<br>As described with respect to Table 7 |
| >Action | ENUMERATED<br>(Add, Delete, Activate, Deactivate) |

At block 814, on reception of Configuration update request from pDU, at block 819, sDU sends Configuration update response message back to pDU in case of successful completion of procedure. Here are the IEs shared in this message:

TABLE 16

| IE/Group Name | IE type and reference |
|---|---|
| UE-ID | INTEGER (0 . . . $2^{32}$ − 1) |
| CRNTI | INTEGER (0 . . . 65535) |
| sDU GTP Tunnel Endpoint | As Shown with respect to Table 9 for pDU GTP Tunnel Endpoint. |
| $T_{waitForStatus}$. | INTEGER (0 . . . 255) |

On reception of Configuration update request from pDU at block 821, at block 822 sDU sends Configuration update failure message back to pDU in case of failure of procedure. IEs shared in this message include:

TABLE 17

| IE/Group Name | IE type and reference |
|---|---|
| UE-ID | INTEGER (0 . . . $2^{32}$ − 1) |
| CRNTI | INTEGER (0 . . . 65535) |
| Cause | As described with respect to Table 7 |

At block 824, in case sDU observes some failure for SCells or for a particular UE or it wants to inform pDU about some configuration change, it can send the UE Configuration Update Required message to pDU with following IEs.

TABLE 18

| IE/Group Name | IE type and reference |
|---|---|
| UE-ID | INTEGER (0 . . . $2^{32}$ − 1) |
| CRNTI | INTEGER (0 . . . 65535) |
| Associated SCell List | As Shown in CLAIM 13 |
| $T_{waitForStatus}$ | INTEGER (0 . . . 255) |
| sDU GTP Tunnel Endpoint | As Shown iwith respect to Table 9 for pDU GTP Tunnel Endpoint |
| Cause | As described with respect to Table 7 |

At block 826, pDU on applying successfully the configuration changes suggested by sDU in Configuration Update Required message, sends Configuration Update Confirm message to inform the sDU the successful modification. Following are the IEs shared in this message:

TABLE 19

| IE/Group Name | IE type and reference |
|---|---|
| UE-ID | INTEGER (0 . . . $2^{32}$ − 1) |
| CRNTI | INTEGER (0 . . . 65535) |
| pDU GTP Tunnel Endpoint | As Shown with respect to Table 9 for pDU GTP Tunnel Endpoint |

Figure 9:
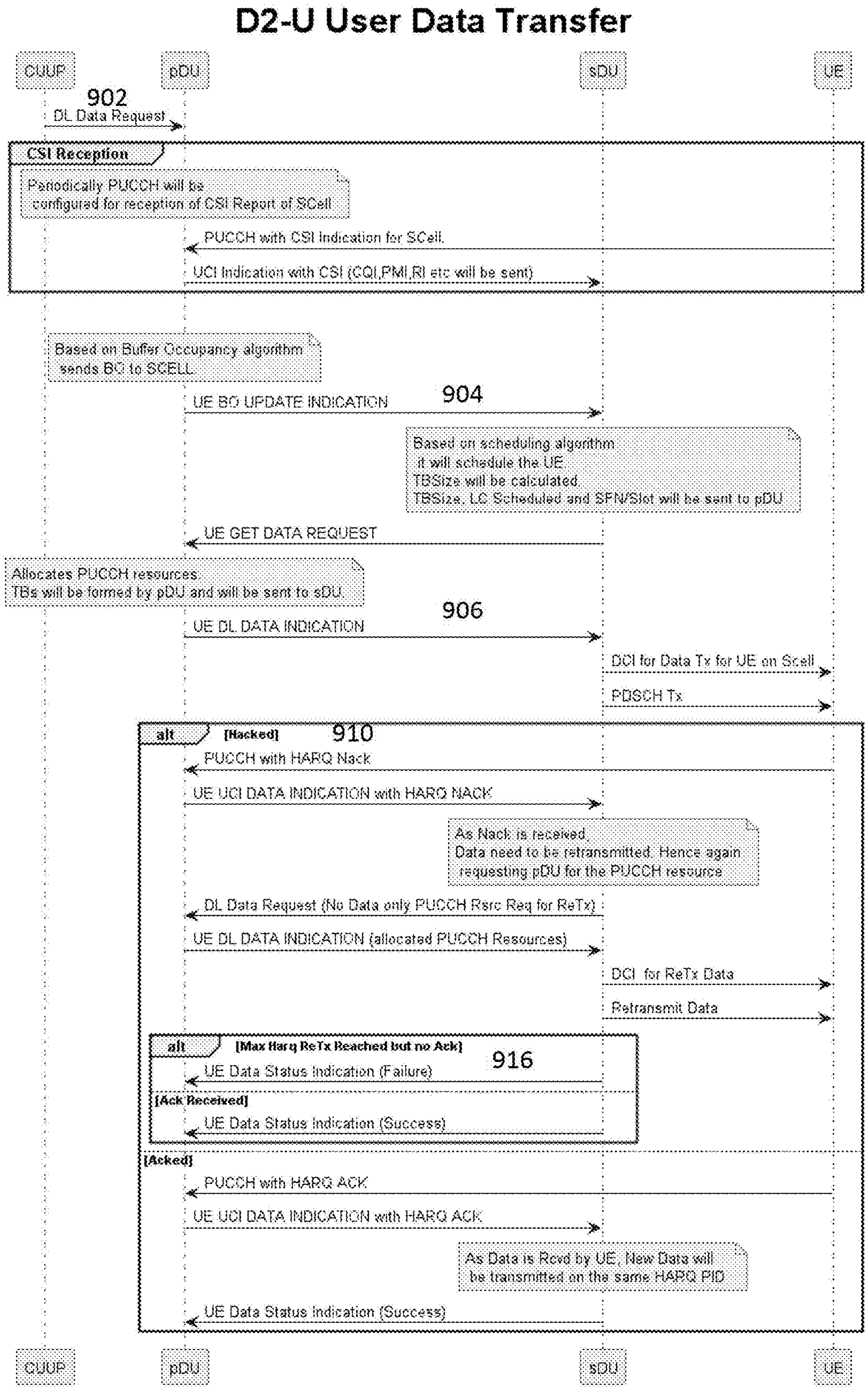
FIG. 9 shows an implementation of an exemplary flow for a data procedure between DUs.

FIG. 9 shows another implementation of an exemplary flow for a data procedure for data transfer between DUs.

To support data transfer between pDU and sDU, pDU uses UE BO Update procedure is to inform sDU about the buffer occupancy of the UE that need to be transferred in the SCELL. UE-ID and RNTI IEs are used for identification of UE.

Buffer-Indication IE Indicates the Data Need to be Transmitted on sDU:

TABLE 20

| IE/Group Name | IE type and reference |
|---|---|
| UE-ID | INTEGER (0 . . . $2^{32}$ − 1) |
| CRNTI | INTEGER (0 . . . 65535) |
| Buffer Indication | OCTET STRING |

To transfer DL data on SCell, at block 902 CUUP sends UE GET DATA REQUEST to pDU to get the data and PUCCH resources for transmission. Following IEs are shared in this message:

TABLE 21

| IE/Group Name | IE type and reference | Semantics description |
|---|---|---|
| UE-ID | INTEGER (0 . . . $2^{32}$ − 1) | |
| CRNTI | INTEGER (0 . . . 65535) | |
| TBSize | INTEGER (1 . . . 120000) | Indicates the size of data to be transferred from PCELL to SCELL for transmission. |
| isOnlyPUCCHRsrc | INTEGER (0 . . . 1) | Indicates if SCELL needs only PUCCH resource allocation or even data is required for transmission. |
| DCI CCE | Integer (0 . . . 273) | Indicates the DCI CCE which is required to calculate PUCCH resource indicator. |
| maxBO | | Indicates the maximum buffer size that can be handled for this UE in Scell. |
| SFN | INTEGER (0 . . . 1028) | SFN of the Radio frame |
| Slot | INTEGER (0 . . . 160) | SLOT for Transmission of Data |

On reception of UE Get Data Request from sDU, at block 904 pDU sends data to sDU by message "10.2.3.3 UE DL DATA INDICATION". Following IEs are encoded as part of this message:

TABLE 22

| IE/Group Name | IE type | Semantics description |
|---|---|---|
| UE-ID | INTEGER (0 . . . $2^{32}$ − 1) | |
| CRNTI | INTEGER (0 . . . 65535) | |
| IsOnlyPUCCHData | INTEGER (0 . . . 1) | Indicates if only PUCCH Resources are sent or even DLData field is present. |
| DLData | OCTET STRING | DL Data which need to be sent on Scell. |
| PUCCH Resource | As mentioned in the table below | Contains the PUCCH related parameters sent by PCELL to SCELL. SCELL will use these parameter while encoding the PDCCH towards UE. |
| SFN | INTEGER (0 . . . 1028) | |
| Slot | INTEGER (0 . . . 160) | |

PUCCH Resource

TABLE 23

| IE/Group Name | IE type and reference | Semantics description |
|---|---|---|
| PUCCH Resource Indicator | INTEGER (0-31) | Indicates the field that needs to be encoded in DL DCI. UE uses it while encoding the PUCCH for the DL data. |
| DAI | INTEGER(0-15) | Used by UE to encode PUCCH. |
| HARQ PID | INTEGER(0-15) | Used by UE to encode PUCCH. |
| K2 | INTEGER(0-15) | Used by UE to encode PUCCH. |
| [Name] . . . | [Type and Reference] . . . | [Semantics description] . . . |

At block 906, UE UCI DATA INDICATION message is sent from pDU to sDU for informing the PUCCH information received for a UE. Following IEs are shared in this message:

TABLE 24

| IE/Group Name | IE type and reference | Semantics description |
|---|---|---|
| UE-ID | INTEGER (0 . . . $2^{32}-1$) | |
| CRNTI | INTEGER (0 . . . 65535) | |
| IsCSIData | INTEGER (0 . . . 1) | Indicates whether CSI Information is present or NOT. |
| CSIData | BIT STRING | CSI data received by PCELL for SCELL |
| IsHarqData | INTEGER (0 . . . 1) | Indicates whether Harq Information is present or NOT. |
| HarqData | BIT STRING | HARQ data received by PCELL for SCELL |

This message is sent by the sDU to pDU to indicate the status of transmitted data. At block 910, if HARQ ACK is received, status will be sent as Success. Otherwise, at block 916, if after max retransmission there is no HARQ ACK, the sDU sends a Failure status to pDU.

TABLE 25

| IE/Group Name | IE type and reference |
|---|---|
| UE-ID | INTEGER (0 . . . $2^{32}-1$) |
| CRNTI | INTEGER (0 . . . 65535) |
| Cause | As described with respect to Table 7 |

It will be understood that implementations and embodiments can be implemented by computer program instructions. These program instructions can be provided to a processor to produce a machine, such that the instructions, which execute on the processor, create means for implementing the actions specified herein. The computer program instructions can be executed by a processor to cause a series of operational steps to be performed by the processor to produce a computer-implemented process such that the instructions, which execute on the processor to provide steps for implementing the actions specified. Moreover, some of the steps can also be performed across more than one processor, such as might arise in a multi-processor computer system or even a group of multiple computer systems. In addition, one or more blocks or combinations of blocks in the flowchart illustration can also be performed concurrently with other blocks or combinations of blocks, or even in a different sequence than illustrated without departing from the scope or spirit of the invention.

The invention claimed is:

1. A cellular communication system comprising:

a group of next-generation NodeBs (gNBs), distributed units (DUs), and central units (CUs), each with multiple sectors, communicating with a set of user equipments (UEs);

each of the CUs, DUs, and gNBs being configured to operate in a separate server or a same server, and each of the CUs, DUs, and gNBs being configured to be physically located at a same place or different places;

each of the set of UEs comprising a plurality of secondary cells (SCELLs) running in different DUs, whereby a primary DU (pDU) medium access control (MAC) module for a primary cell (PCELL) is configured to operate in one DU and a secondary DU (sDU) MAC module for a SCELL is configured to operate in a different one of the DUs; and a MAC module in each DU configured to exchange a message with a peer DU MAC module for a seamless data transfer for supporting inter-DU or virtual DU (vDU) carrier aggregation for a UE of the set of UEs;

wherein each DU is configured to update the CU about SCELLs from another DU with which the DU has a DU-DU relationship, and is operable to configure the SCELLs from the other DU for functionalities, whereby the CU is configured to determine that the DU is not directly serving the SCELLs and is responsible for configuring the SCELLs.

2. The system of claim 1, wherein a pDU MAC module is configured to share an available buffer information with the sDU MAC module for downlink (DL) data transfer for the UE.

3. The system of claim 2, wherein the sDU MAC module is configured to request for the data from the pDU MAC module once the UE is scheduled in a SCELL for data transfer or when the sDU MAC needs the data from the pDU MAC module.

4. The system of claim 2, wherein the sDU MAC module is configured to share the timing information including a system frame number (SFN) and slot with the pDU MAC module, and where the UE is getting scheduled.

5. The system of claim 4, wherein the pDU MAC module is configured to allocate physical uplink control channel (PUCCH) resources, using the timing information provided by the sDU MAC module for hybrid automatic repeat request (HARQ) feedback for data transmitted on the SCELL.

6. The system of claim 1, where a pair of the DUs are configured to use a single tunnel to exchange the user data and Scell modification procedures for all the UEs between the DUs, wherein the tunnel can be established either at a DU-DU link establishment or at a Scell addition for a first UE of the set of UEs between the pair of DUs.

7. The system of claim 1, where a pair of the DUs are configured to combine multiple messages into a single message to be transferred via a General Packet Radio Service Tunneling Protocol (GTP) tunnel.

8. The system of claim 7, wherein a pDU MAC module is configured to share an available buffer information with the sDU MAC module for downlink (DL) data transfer for the UE.

9. The system of claim 8, wherein the sDU MAC module is configured to request for the data from the pDU MAC module once the UE is scheduled in a SCELL for data transfer or when the sDU MAC needs the data from the pDU MAC module.

10. The system of claim 7, wherein the sDU MAC module is configured to share the timing information including a system frame number (SFN) and slot with the pDU MAC module, and where the UE is getting scheduled.

11. The system of claim 10, wherein the pDU MAC module is configured to allocate Physical Uplink Control Channel (PUCCH) resources, using the timing information provided by the sDU MAC module for Hybrid Automatic Repeat Request (HARQ) feedback for data transmitted on the SCELL.

12. The system of claim 1, where each of the CU, DU, gNBs are configured with SCells from the other DUs.

13. The system of claim 12 where the CU can configure DU with SCells from other DUs to be configured for a UE.

14. The system of claim 1, where all the DUs are configured to support and inter O-DU carrier aggregation (CA) spectrum aggregation, and are configured with a transport mechanism to exchange messages with each other.

15. The system of claim 1 where each DU is configured to calculate a latency introduced due to introduction of the other DU.

16. The system of claim 1, where each DU is configured to, read a configuration defined for the other DUs.

17. The system of claim 16, wherein the sDU of the group of DUs is configured to, on reception of UE Addition request or any other message for Scell addition for a UE from another DU in the group, send a UE addition response including a user equipment identifier (UE-ID), a cell radio network temporary identifier (C-RNTI), an sDU General Packet Radio Service Tunneling Protocol (GTP) tunnel endpoint, and a time (T) wait for status value.

18. The system of claim 1, where DUs are configured to establish a link with each other, the link being configured for later use during a data transfer, wherein at the link establishment, the DUs are configured to exchange a cell list and configuration parameters, and, if link establishment fails, the DUs are configured to inform a peer entity.

19. The system of claim 1 wherein the sDU, on reception of addition of a cell from another DU, is configured to do admission control for the UE.

20. The system of claim 19, wherein if the sDU cannot handle the UE, the sDU is configured to send a failure message to the pDU; and if the sDU cannot handle any UE, the sDU is configured to send a failure message to the pDU that it cannot handle any UE, and the pDU is configured to be able to reject the addition of Cells from the sDU if the sDU cannot handle any UE.

21. The system of claim 1, where the sDU is configured to inform the pDU about an addition of another new cell for the same UE.

22. The system of claim 1, where the pDU is configured to inform the DU about an activation or deactivation of Cells that were selected for spectrum aggregation for a UE.

* * * * *